(12) United States Patent
Lee

(10) Patent No.: US 11,992,063 B2
(45) Date of Patent: May 28, 2024

(54) METHOD FOR CONTROLLING ELECTRIC POWER OF HEATER OF AEROSOL GENERATOR, AND AEROSOL GENERATOR

(71) Applicant: KT&G CORPORATION, Daejeon (KR)

(72) Inventor: Jae Min Lee, Siheung-si (KR)

(73) Assignee: KT&G CORPORATION, Daejeon (KR)

(*) Notice: Subject to any disclaimer, the term of this patent is extended or adjusted under 35 U.S.C. 154(b) by 817 days.

(21) Appl. No.: 17/056,502

(22) PCT Filed: Oct. 23, 2019

(86) PCT No.: PCT/KR2019/013997
§ 371 (c)(1),
(2) Date: Nov. 18, 2020

(87) PCT Pub. No.: WO2020/101203
PCT Pub. Date: May 22, 2020

(65) Prior Publication Data
US 2021/0177065 A1    Jun. 17, 2021

(30) Foreign Application Priority Data
Nov. 16, 2018 (KR) .................. 10-2018-0141972

(51) Int. Cl.
*A24F 40/57*   (2020.01)
*G05B 6/02*   (2006.01)
(Continued)

(52) U.S. Cl.
CPC ............. *A24F 40/57* (2020.01); *G05B 6/02* (2013.01); *H05B 1/0227* (2013.01); *A24D 1/20* (2020.01);
(Continued)

(58) Field of Classification Search
CPC .......... A24F 40/57; A24F 40/50; A24F 40/40; A24F 40/30; A24F 40/20; A24F 40/10; G05B 6/02; H05B 1/0227
(Continued)

(56) References Cited

U.S. PATENT DOCUMENTS

| 8,151,803 B2 | 4/2012 | Inagaki |
| 9,791,904 B2 | 10/2017 | Rosenzweig et al. |

(Continued)

FOREIGN PATENT DOCUMENTS

| CN | 107924203 A | 4/2018 |
| CN | 108143009 A | 6/2018 |

(Continued)

OTHER PUBLICATIONS

Chinese Office Action dated Feb. 13, 2023 in Chinese Application No. 201980034806.3.
(Continued)

*Primary Examiner* — Khiem M Nguyen
(74) *Attorney, Agent, or Firm* — Sughrue Mion, PLLC

(57) ABSTRACT

An embodiment of the present invention discloses an aerosol-generating device, the device including a heater for heating an aerosol-generating substrate, and a controller for controlling power supplied to the heater through a proportional integral differential (PID) method, based on an integral control weight determined according to an initial temperature of the heater.

19 Claims, 8 Drawing Sheets

(51) Int. Cl.
*H05B 1/02* (2006.01)
*A24D 1/20* (2020.01)
*A24F 40/10* (2020.01)
*A24F 40/20* (2020.01)
*A24F 40/30* (2020.01)

(52) U.S. Cl.
CPC ............... *A24F 40/10* (2020.01); *A24F 40/20* (2020.01); *A24F 40/30* (2020.01)

(58) Field of Classification Search
USPC ........................................................ 131/329
See application file for complete search history.

(56) References Cited

U.S. PATENT DOCUMENTS

| | | | |
|---|---|---|---|
| 9,949,507 | B2 | 4/2018 | Flick |
| 10,674,770 | B2 | 6/2020 | Talon |
| 11,013,872 | B2* | 5/2021 | Silvestrini ......... A61M 15/0021 |
| 11,541,193 | B2* | 1/2023 | Lee ...................... H05B 1/0227 |
| 11,751,606 | B2* | 9/2023 | Gallagher ............... A24F 40/60 |
| | | | 131/329 |
| 2018/0042308 | A1 | 2/2018 | Takeuchi et al. |
| 2018/0093291 | A1 | 4/2018 | Benjamin |
| 2019/0072990 | A1 | 3/2019 | Mulcahy |
| 2021/0052835 | A1* | 2/2021 | Lee ........................... H05B 1/02 |
| 2021/0177065 | A1* | 6/2021 | Lee ...................... H05B 1/0244 |
| 2021/0298364 | A1 | 9/2021 | Yu et al. |
| 2022/0322746 | A1 | 10/2022 | Talon |

FOREIGN PATENT DOCUMENTS

| | | |
|---|---|---|
| CN | 108652089 A | 10/2018 |
| JP | 63-132302 A | 6/1988 |
| JP | 2011-034386 A | 2/2011 |
| JP | 2015-503916 A | 2/2015 |
| JP | 2017-32235 A | 2/2017 |
| KR | 10-2017-0019454 A | 2/2017 |
| KR | 10-1792905 B1 | 11/2017 |
| RU | 2400110 C1 | 9/2010 |
| RU | 2613785 C2 | 3/2017 |
| WO | 2018/019786 A1 | 2/2018 |
| WO | 2018/122389 A1 | 7/2018 |
| WO | 2018/202403 A1 | 11/2018 |

OTHER PUBLICATIONS

"Introduction to Intelligent Control Technology", Beijing: National Defense Industry, 2008, pp. 160-164 (8 pages total).

Chanjuan et al., "Design of Integral Separation SNPID in Fruit and Vegetable Puffing Temperature Control System", Computer Measurement & Control, China Academic Journal Electronic Publishing House, 2014, pp. 3967-3972 (4 pages total).

Wang et al., Intelligent Set-point Weighting PID Control, Given value weighting intelligent PID control, China Academic Journal Electronic Publishing House, 1994, pp. 16-19 (4 pages total).

Communication dated Jul. 6, 2021, issued by the Japanese Patent Office in application No. 2020-541928.

Korea Intellectual Property Office Notice of Non-Final Rejection for KR 10-2018-0141972 dated Jun. 10, 2020.

International Search Report for PCT/KR2019/013997 dated Jan. 29, 2020 [PCT/ISA/210].

Office Action dated Apr. 21, 2022 issued by the Russian Patent Office in Russian Application No. 2021113568/07.

Extended European Search Report dated Feb. 18, 2022 in European Application No. 19885489.5.

* cited by examiner

METHOD FOR CONTROLLING ELECTRIC POWER OF HEATER OF AEROSOL GENERATOR, AND AEROSOL GENERATOR

CROSS REFERENCE TO RELATED APPLICATIONS

This application is a National Stage of International Application No. PCT/KR2019/013997 filed Oct. 23, 2019, claiming priority based on Korean Patent Application No. 10-2018-0141972 filed Nov. 16, 2018.

TECHNICAL FIELD

The present invention relates to a method of controlling electric power of a heater of an aerosol-generating device and an aerosol-generating device thereof, and more particularly, to a method of controlling electric power of a heater of an aerosol-generating device and an aerosol-generating device thereof, wherein by controlling the electric power supplied to the heater of the aerosol-generating device by a proportional integral differential control method, a smoking sensation remains constant during continuous smoking through the aerosol-generating device.

BACKGROUND ART

Recently, the demand for alternative ways of overcoming the disadvantages of common cigarettes has increased. For example, there is growing demand for a method of generating aerosol by heating an aerosol-generating material in cigarettes, rather than by combusting cigarettes. Accordingly, research into a heating-type cigarette and a heating-type aerosol generator has been actively conducted.

Through a known aerosol-generating device, a user may continuously enjoy smoking. However, according to a known aerosol-generating device, when the user continues to use the aerosol-generating device with short inhaling terms, it is difficult to maintain the temperature of the heater for generating the aerosol in the aerosol-generating device in a properly elevated state, which results in an insufficient atomization amount of the aerosol.

DESCRIPTION OF EMBODIMENTS

Technical Problem

The technical problem to be solved by the present invention is to implement an aerosol-generating device for providing aerosols with a constant amount of atomization to a user even if a user smokes continuously through the aerosol-generating device.

Solution to Problem

A device according to an embodiment of the present invention for solving the above technical problem, as an aerosol-generating device, may include a heater for heating an aerosol-generating substrate, and a controller for controlling power supplied to the heater through a proportional integral differential (PID) method, based on an integral control weight determined according to an initial temperature of the heater.

A method according to an embodiment of the present invention for solving the above technical problem, as a method for controlling power supplied to a heater of an aerosol-generating device, may include determining an initial temperature of the heater of the aerosol-generating device; determining an integral control weight for integral control in proportional integral differential control based on the determined initial temperature of the heater; and maintaining a temperature of the heater based on the determined integral control weight after the temperature of the heater reaches a preheating temperature.

One embodiment of the present invention may provide a computer-readable recording medium storing a program for executing the method.

Advantageous Effects of Disclosure

According to the present invention, a reduction in an amount of atomization due to the continuous use is prevented, and a user may have a consistent smoking feeling even if the user continuously smokes through an aerosol-generating device.

BEST MODE

Figure 1:
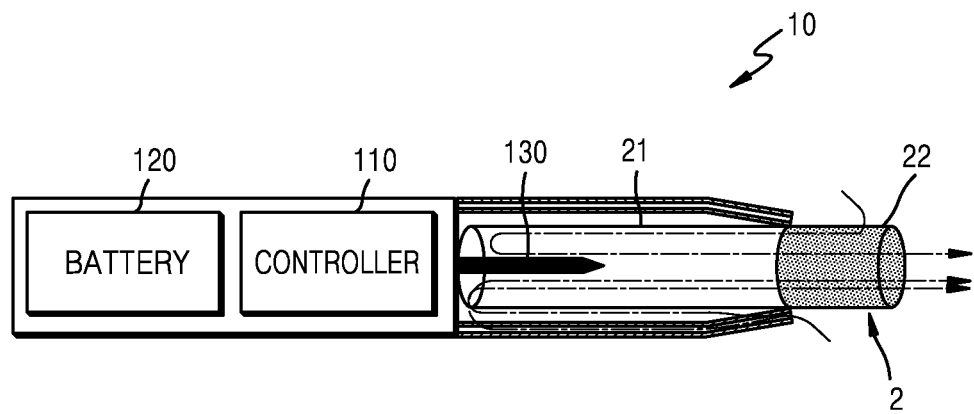
FIGS. 1 through 3 are diagrams showing examples in which a cigarette is inserted into an aerosol-generating device.

A device according to an embodiment of the present invention for solving the above technical problem, as an aerosol-generating device, may include a heater for heating an aerosol-generating substrate, and a controller for controlling power supplied to the heater through a proportional integral differential (PID) method, based on an integral control weight determined according to an initial temperature of the heater.

In the device, the controller may calculate the integral control weight based on the initial temperature of the heater which is measured after a certain period of time has elapsed after a temperature of the heater reaches a preset preheating temperature.

In the device, the controller may calculate the integral control weight based on an integral control gain value used when the heater is preheated to 50° C.

In the device, the controller may calculate the integral control weight based on a highest temperature which the heater has reached in a first preheating process.

In the device, the controller may calculate the integral control weight based on a highest integral control gain value in a first preheating process, by referring to integral control gain values used in the first preheating process of the heater.

In the device, the controller may determine the integral control weight by referring to a table in which integral control weights are respectively associated with initial temperatures of the heater.

In the device, the integral control weight may be equal to or greater than 20.

In the device, the integral control weight may be equal to or less than 70.

In the device, the integral control weight may be in a range of 20 to 70.

A method according to an embodiment of the present invention for solving the above technical problem, as a method for controlling power supplied to a heater of an aerosol-generating device, may include determining an initial temperature of the heater of the aerosol-generating device; determining an integral control weight for integral control in proportional integral differential control based on the determined initial temperature of the heater; and maintaining a temperature of the heater based on the determined integral control weight after the temperature of the heater reaches a preheating temperature.

In the method, the determining of an integral control weight may include calculating an integral control weight based on the initial temperature of the heater which is measured after a certain period of time has elapsed after the temperature of the heater reaches a preset preheating temperature.

In the method, the determining of an integral control weight may include a controller calculating the integral control weight based on an integral control gain value used when the heater is preheated to 50° C.

In the method, the determining of an integral control weight may include calculating the integral control weight based on a highest temperature which the heater has reached in a first preheating process.

In the method, the determining of an integral control weight may include calculating the integral control weight based on a highest integral control gain value in a first preheating process, by referring to integral control gain values used in the first preheating process of the heater.

In the method, the determining of an integral control weight may include determining the integral control weight by referring to a table in which integral control weights are respectively associated with initial temperatures of the heater.

In the method, the integral control weight may be equal to or greater than 20.

In the method, the integral control weight may be equal to or less than 70.

In the method, the integral control weight may be in a range of 20 to 70.

One embodiment of the present invention may provide a computer-readable recording medium storing a program for executing the method.

MODE OF DISCLOSURE

As the present disclosure allows for various changes and numerous embodiments, particular embodiments will be illustrated in the drawings and described in detail in the written description. The attached drawings for illustrating the present disclosure are referred to in order to gain a sufficient understanding, the merits thereof, and the objectives accomplished by the implementation. However, the present disclosure may have different forms and should not be construed as being limited to the descriptions set forth herein.

Example embodiments will be explained in detail below with reference to the accompanying drawings. Those elements that are the same or are in correspondence are rendered the same reference numeral regardless of the figure number, and redundant explanations are omitted.

While such terms as "first," "second," etc., may be used to describe various elements, such elements must not be limited to the above terms. The above terms are used only to distinguish one element from another.

An expression used in the singular encompasses the expression of the plural, unless it has a clearly different meaning in the context.

In the present specification, it is to be understood that the terms such as "including," "having," and "comprising" are intended to indicate the existence of the features or elements disclosed in the specification, and are not intended to preclude the possibility that one or more other features or elements may exist or may be added.

When a certain embodiment may be implemented differently, a specific process order may be performed differently from the described order. For example, two consecutively described processes may be performed substantially at the same time or performed in an order opposite to the described order.

Hereinafter, embodiments of the present disclosure will be described in detail with reference to the drawings.

Figure 2:
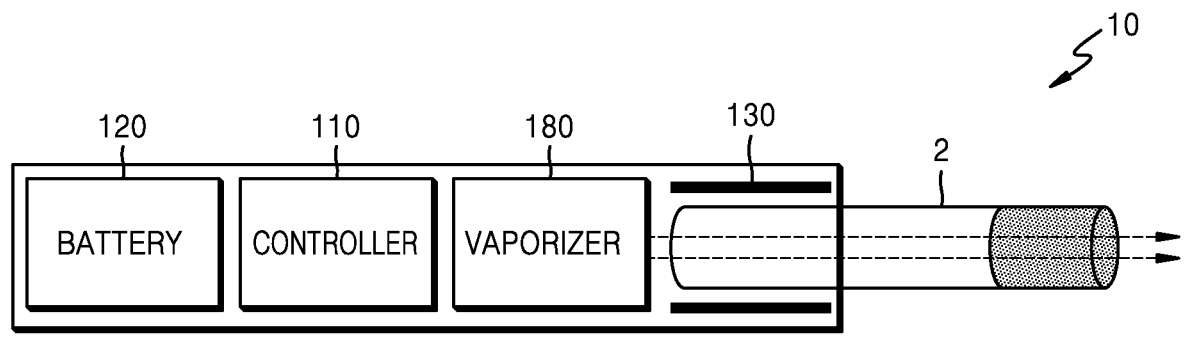
Figure 3:
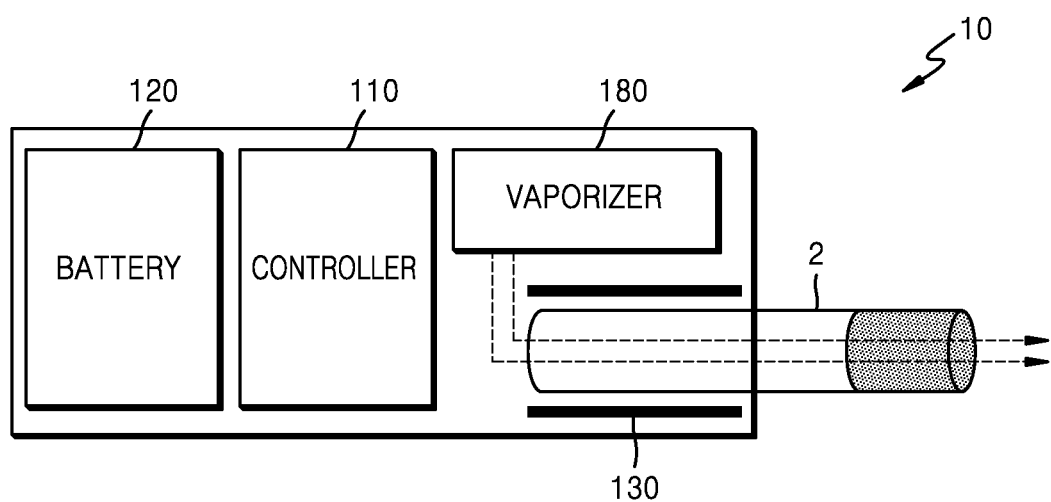

FIGS. 1 through 3 are diagrams showing examples in which a cigarette is inserted into an aerosol generating apparatus.

Referring to FIG. 1, an aerosol generator 10 includes a battery 120, a controller 110, and a heater 130. Referring to FIG. 2 and FIG. 3, the aerosol generator 10 further includes a vaporizer 180. Also, a cigarette 2 may be inserted into an inner space of the aerosol generator 10.

The elements related to the embodiment are illustrated in the aerosol generator 10 of FIGS. 1 to 3. Therefore, one of ordinary skill in the art would appreciate that other universal elements than the elements shown in FIGS. 1 to 3 may be further included in the aerosol generator 10.

Also, FIGS. 2 and 3 show that the aerosol generator 10 includes the heater 130, but if necessary, the heater 130 may be omitted.

In FIG. 1, the battery 120, the controller 110, and the heater 130 are arranged in a row. Also, FIG. 2 shows that the battery 120, the controller 110, the vaporizer 180, and the heater 130 are arranged in a row. Also, FIG. 3 shows that the vaporizer 180 and the heater 130 are arranged in parallel with each other. However, an internal structure of the aerosol generator 10 is not limited to the examples shown in FIGS. 1 to 3. That is, according to a design of the aerosol generator 10, arrangement of the battery 120, the controller 110, the heater 130, and the vaporizer 180 may be changed.

When the cigarette 2 is inserted into the aerosol generator 10, the aerosol generator 10 operates the heater 130 and/or the vaporizer 180 to generate aerosol from the cigarette 2 and/or the vaporizer 180. The aerosol generated by the heater 130 and/or the vaporizer 180 may be transferred to a user via the cigarette 2.

If necessary, even when the cigarette 2 is not inserted in the aerosol generator 10, the aerosol generator 10 may heat the heater 130.

The battery 120 supplies the electric power used to operate the aerosol generator 10. For example, the battery 120 may supply power for heating the heater 130 or the vaporizer 180 and supply power for operating the controller 110. In addition, the battery 120 may supply power for operating a display, a sensor, a motor, and the like installed in the aerosol generator 10.

The controller 110 controls the overall operation of the aerosol generator 10. In detail, the controller 110 may control operations of other elements included in the aerosol generator 10, as well as the battery 120, the heater 130, and the vaporizer 180. Also, the controller 110 may check the status of each component in the aerosol generator 10 to determine whether the aerosol generator 10 is in an operable state.

The controller 110 includes at least one processor. A processor can be implemented as an array of a plurality of logic gates or can be implemented as a combination of a general-purpose microprocessor and a memory in which a program executable in the microprocessor is stored. It will be understood by one of ordinary skill in the art that the present disclosure may be implemented in other forms of hardware.

The heater 130 may be heated by the electric power supplied from the battery 120. For example, when the cigarette is inserted in the aerosol generator 10, the heater 130 may be located outside the cigarette. Therefore, the heated heater 130 may raise the temperature of an aerosol generating material in the cigarette.

The heater 130 may be an electro-resistive heater. For example, the heater 130 includes an electrically conductive track, and the heater 130 may be heated as a current flows through the electrically conductive track. However, the heater 130 is not limited to the above example, and any type of heater may be used provided that the heater is heated to a desired temperature. Here, the desired temperature may be set in advance on the aerosol generator 10, or may be set by a user.

In addition, in another example, the heater 130 may include an induction heating type heater. In detail, the heater 130 may include an electrically conductive coil for heating the cigarette in an induction heating method, and the cigarette may include a susceptor that may be heated by the induction heating type heater.

For example, the heater 130 may include a tubular type heating element, a plate type heating element, a needle type heating element, or a rod type heating element, and may heat the inside or outside of the cigarette 2 according to the shape of the heating element.

Also, there may be a plurality of heaters 13 in the aerosol generator 10. Here, the plurality of heaters 13 may be arranged to be inserted into the cigarette 2 or on the outside of the cigarette 2. Also, some of the plurality of heaters 13 may be arranged to be inserted into the cigarette 2 and the other may be arranged on the outside of the cigarette 2. In addition, the shape of the heater 130 is not limited to the example shown in FIGS. 1 to 3, but may be manufactured in various shapes.

The vaporizer 180 may generate aerosol by heating a liquid composition and the generated aerosol may be delivered to the user after passing through the cigarette 2. In other words, the aerosol generated by the vaporizer 180 may move along an air flow passage of the aerosol generator 10, and the air flow passage may be configured for the aerosol generated by the vaporizer 180 to be delivered to the user through the cigarette.

For example, the vaporizer 180 may include a liquid storage unit, a liquid delivering unit, and a heating element, but is not limited thereto. For example, the liquid storage unit, the liquid delivering unit, and the heating element may be included in the aerosol generator 10 as independent modules.

The liquid storage may store a liquid composition. For example, the liquid composition may be a liquid including a tobacco containing material including a volatile tobacco flavor component, or a liquid including a non-tobacco material. The liquid storage unit may be detachable from the vaporizer 180 or may be integrally manufactured with the vaporizer 180.

For example, the liquid composition may include water, solvents, ethanol, plant extracts, flavorings, flavoring agents, or vitamin mixtures. The flavoring may include, but is not limited to, menthol, peppermint, spearmint oil, various fruit flavoring ingredients, etc. The flavoring agent may include components that may provide the user with various flavors or tastes. Vitamin mixtures may be a mixture of at least one of vitamin A, vitamin B, vitamin C, and vitamin E, but are not limited thereto. Also, the liquid composition may include an aerosol former such as glycerin and propylene glycol.

The liquid delivery element may deliver the liquid composition of the liquid storage to the heating element. For example, the liquid delivery element may be a wick such as cotton fiber, ceramic fiber, glass fiber, or porous ceramic, but is not limited thereto.

The heating element is an element for heating the liquid composition delivered by the liquid delivering unit. For example, the heating element may be a metal heating wire, a metal hot plate, a ceramic heater, or the like, but is not limited thereto. In addition, the heating element may include a conductive filament such as nichrome wire and may be positioned as being wound around the liquid delivery element. The heating element may be heated by a current supply and may transfer heat to the liquid composition in contact with the heating element, thereby heating the liquid composition. As a result, aerosol may be generated.

For example, the vaporizer 180 may be referred to as a cartomizer or an atomizer, but is not limited thereto.

In addition, the aerosol generator 10 may further include universal elements, in addition to the battery 120, the controller 110, the heater 130, and the vaporizer 180. For example, the aerosol generator 10 may include a display capable of outputting visual information and/or a motor for outputting tactile information. In addition, the aerosol generator 10 may include at least one sensor (a puff sensor, a temperature sensor, a cigarette insertion sensor, etc.) Also, the aerosol generator 10 may be manufactured to have a structure, in which external air may be introduced or internal air may be discharged even in a state where the cigarette 2 is inserted.

Although not shown in FIGS. 1 to 3, the aerosol generator 10 may configure a system with an additional cradle. For example, the cradle may be used to charge the battery 120 of the aerosol generator 10. Alternatively, the heater 130 may be heated in a state in which the cradle and the aerosol generator 10 are coupled to each other.

The cigarette 2 may be similar to a traditional combustive cigarette. For example, the cigarette 2 may include a first portion containing an aerosol generating material and a second portion including a filter and the like. The second portion of the cigarette 2 may also include the aerosol generating material. For example, an aerosol-generating material made in the form of granules or capsules may be inserted into the second portion.

Alternatively, only a portion of the first portion may be inserted into the aerosol generator 10 or the entire first portion and a portion of the second portion may be inserted into the aerosol generator 10. The user may puff aerosol while holding the second portion by the mouth of the user. The user may puff aerosol while holding the second portion by the mouth of the user. At this time, the aerosol is generated by as the outside air passes through the first portion, and the generated aerosol passes through the second portion and is delivered to a user's mouth.

For example, the outside air may be introduced through at least one air passage formed in the aerosol generator 10. For example, the opening and closing of the air passage formed in the aerosol generator 10 and/or the size of the air passage may be adjusted by a user. Accordingly, the amount and quality of the aerosol may be adjusted by the user. In another example, the outside air may be introduced into the cigarette 2 through at least one hole formed in a surface of the cigarette 2.

Hereinafter, an example of the cigarette 2 will be described with reference to FIGS. 4 and 5.

Figure 4:
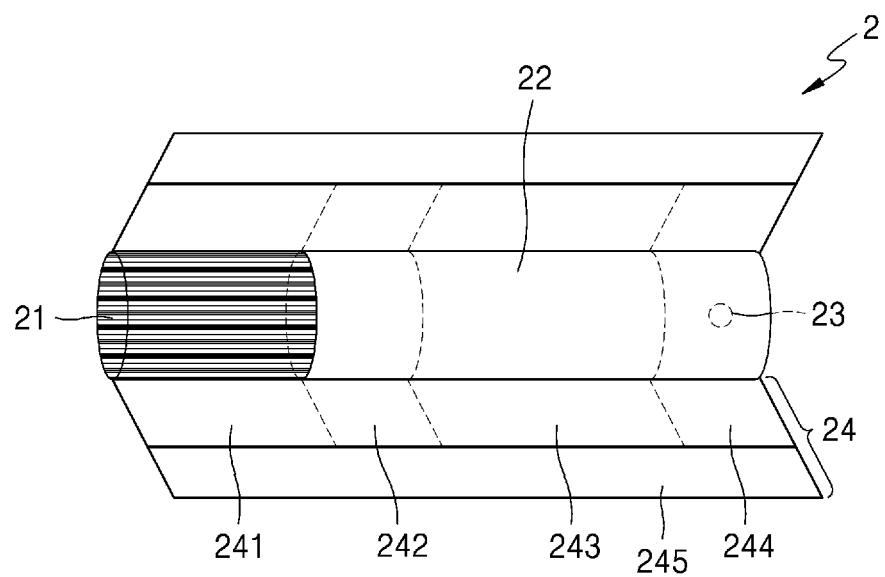
FIGS. 4 and 5 are diagrams showing examples of cigarettes.
Figure 5:
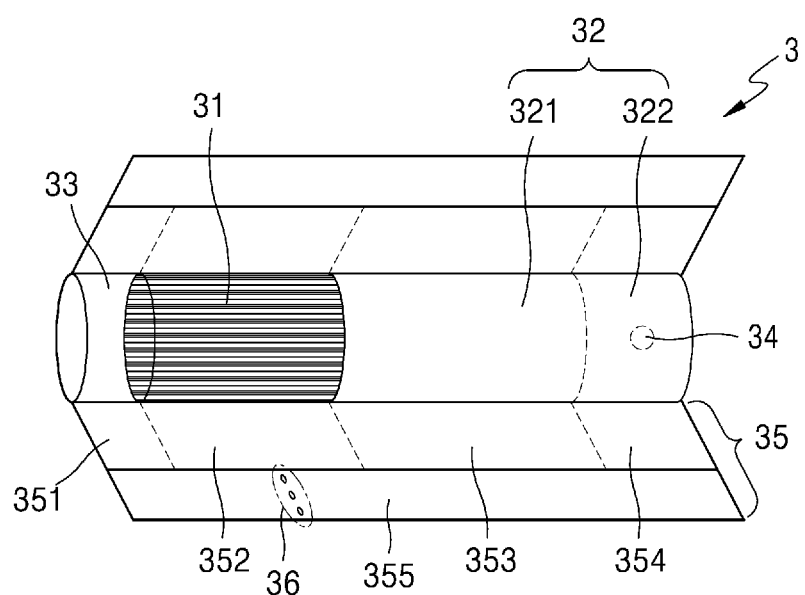

FIGS. 4 and 5 illustrate an example of a cigarette.

Referring to FIG. 4, the cigarette 2 includes a tobacco rod 21 and a filter rod 22. The first portion described above with reference to FIGS. 1 to 3 include the tobacco rod 21 and the second portion includes the filter rod 22.

In FIG. 4, the filter rod 22 is shown as a single segment, but is not limited thereto. In other words, the filter rod 22 may include a plurality of segments. For example, the filter rod 22 may include a first segment for cooling down the aerosol and a second segment for filtering a predetermined component included in the aerosol. Also, if necessary, the filter rod 22 may further include at least one segment performing another function.

A diameter of the cigarette 2 may be in the range of 5 mm to 9 mm, and a length thereof may be about 48 mm, but embodiments are not limited thereto. For example, a length of the tobacco rod 21 may be approximately 12 mm, a length of the first segment of the filter rod 22 may be approximately 10 mm, a length of the second segment of the filter rod 22 may be approximately 14 mm, and a length of the third segment of the filter rod 22 may be approximately 12 mm. However, embodiments are not limited thereto.

The cigarette 2 may be packaged by at least one wrapper 24. The wrapper 24 may include at least one hole through which the outside air is introduced or inside air is discharged. For example, the cigarette 2 may be packaged by one wrapper 24. In another example, the cigarette 2 may be packaged by two or more wrappers 24. For example, the tobacco rod 21 may be packaged via a first wrapper 241, and the filter rod 22 may be packaged by wrappers 242 to 244. And the entire cigarette 2 may be packaged by another wrapper 245. When the filter rod 22 includes a plurality of segments, each segment may be packaged by separate wrapper 242, 243, and 244.

The first wrapper 241 and the second wrapper 242 may be formed of general plug wrap paper. For example, the first wrapper 241 and the second wrapper 242 may be porous wrapping paper or non-porous wrapping paper. Also, the first wrapper 241 and the second wrapper 242 may be made of an oil-resistant paper sheet and an aluminum laminate packaging material.

The third wrapper 243 may be made of a hard wrapping paper. For example, a basis weight of the third wrapper 243 may be within a range of 88 g/m2 to 96 g/m2. Preferably, it may be within a range of 90 g/m2 to 94 g/m2. Also, a total thickness of the third wrapper 243 may be within a range of 120 μm to 130 μm. Preferably, it may be 125 μm.

The fourth wrapper 244 may be made of an oil-resistant hard wrapping paper. For example, the basis weight of the fourth wrapper 244 may be within a range of about 88 g/m2 to about 96 g/m2. Preferably, it may be within a range of 90 g/m² to 94 g/m². Also, a total thickness of the fourth wrapper 244 may be within a range of 120 μm to 130 μm. Preferably, it may be 125 μm.

The fifth wrapper 245 may be made of a sterilized paper (MFW). Here, the MFW refers to a paper specially manufactured to have enhanced tensile strength, water resistance, smoothness, and the like, compared to ordinary paper. For example, the basis weight of the fifth wrapper 245 may be within a range of 57 g/m² to 63 g/m². Preferably, it may be about 60 g/m². Also, the total thickness of the fifth wrapper 245 may be within a range of 64 μm to 70 μm. Preferably, it may be 67 μm.

The tobacco rod 21 includes an aerosol generating material. For example, the aerosol-generating material may include at least one of glycerin, propylene glycol, ethylene glycol, dipropylene glycol, diethylene glycol, triethylene glycol, tetraethylene glycol, and oleyl alcohol, but it is not limited thereto. In addition, the tobacco rod 21 may include other additive materials like a flavoring agent, a wetting agent, and/or an organic acid. Also, a flavoring liquid such as menthol, humectant, etc. may be added to the tobacco rod 21 by being sprayed to the tobacco rod 21.

The fifth wrapper 245 may prevent the cigarette 2 from being burned. For example, when the tobacco rod 210 is heated by the heater 13, there is a possibility that the cigarette 2 is burned. In detail, when the temperature is raised to a temperature above the ignition point of any one of materials included in the tobacco rod 210, the cigarette 2 may be burned. Even in this case, since the fifth wrapper 245 include a non-combustible material, the burning of the cigarette 2 may be prevented.

Furthermore, the fifth wrapper 245 may prevent the aerosol generating device 1 from being contaminated by substances formed by the cigarette 2. Through puffs of a user, liquid substances may be formed in the cigarette 2. For example, as the aerosol formed by the cigarette 2 is cooled by the outside air, liquid materials (e.g., moisture, etc.) may be formed. As the fifth wrapper 245 wraps the cigarette 2, the liquid materials formed in the cigarette 2 may be prevented from being leaked out of the cigarette 2.

The tobacco rod 21 may include an aerosol generating material. For example, the aerosol generating material may include at least one of glycerin, propylene glycol, ethylene glycol, dipropylene glycol, diethylene glycol, triethylene glycol, tetraethylene glycol, and oleyl alcohol, but it is not limited thereto. Also, the tobacco rod 21 may include other additives, such as flavors, a wetting agent, and/or organic acid. Also, the tobacco rod 21 may include a flavored liquid, such as menthol or a moisturizer, which is injected to the tobacco rod 21.

The tobacco rod 21 may be manufactured in various forms. For example, the tobacco rod 21 may be fabricated as a sheet or strands. Also, the tobacco rod 21 may be fabricated by tobacco leaves that are obtained by fine-cutting a tobacco sheet. Also, the tobacco rod 21 may be surrounded by a heat conducting material. For example, the heat-conducting material may be, but is not limited to, a metal foil such as aluminum foil. For example, the heat conducting material surrounding the tobacco rod 21 may improve a thermal conductivity applied to the tobacco rod by evenly dispersing the heat transferred to the tobacco rod 21, and thereby improving tobacco taste. Also, the heat conducting material surrounding the tobacco rod 21 may function as a susceptor that is heated by an inducting heating type heater. Although not shown in the drawings, the tobacco rod 21 may further include a susceptor, in addition to the heat conducting material surrounding the outside thereof.

The filter rod 22 may be a cellulose acetate filter. In addition, the filter rod 22 is not limited to a particular shape. For example, the filter rod 22 may be a cylinder type rod or a tube type rod including a cavity therein. Also, the filter rod 22 may be a recess type rod. When the filter rod 22 includes a plurality of segments, at least one of the plurality of segments may have a different shape from the others.

The first segment of the filter rod 22 may be made of cellulose acetate. For example, the first segment may be a tube-shaped structure containing a hollow therein. The first segment may prevent an internal material of the tobacco rod 21 from being pushed back when the heater 13 is inserted into the tobacco rod 210 and may also provide a cooling effect to the aerosol. A diameter of the hollow included in the first segment may be an appropriate diameter within a range of 2 mm to 4.5 mm but is not limited thereto.

A length of the first filter segment may be appropriately selected within a range of 4 mm to 30 mm, but is not limited thereto. Preferably, the length of the first filter segment may be 10 mm, but is not limited thereto.

Hardness of the first filter segment may be adjusted by adjusting content of a plasticizer at the time of manufacturing the first filter segment. In addition, the first filter segment may be made by inserting a structure such as a film or a tube of the same material or different materials therein (for example, in a hollow).

The second segment of the filter rod 22 cools an aerosol generated by the heater 13 heating the tobacco rod 21. As such, a user may inhale the aerosol cooled to an appropriate temperature.

A length or a diameter of the second segment may be variously determined according to a shape of the cigarette 2. For example, a length of the second segment may be appropriately selected within a range of 7 mm to 20 mm. Preferably, the length of the second segment may be 14 mm, but is not limited thereto.

The second segment may be made by weaving polymer fiber. In this case, the fiber made of a polymer may be coated with a flavored liquid. Alternatively, the second segment may also be made by weaving fiber coated with a flavored liquid and fiber made of a polymer. Alternatively, the cooling structure 222 may be formed of a crimped polymer sheet.

The polymer may be made of a material selected from a group consisting of polyethylene (PE), polypropylene (PP), polyvinyl chloride (PVC), polyethylene terephthalate (PET), polylactic acid (PLA), cellulose acetate (CA), and aluminum foil.

Since the second segment is formed of woven polymer fiber or a crimped polymer sheet, the second segment may include single or multiple channels extending in a longitudinal direction. Here, the channel indicates a passage through which gas (for example, air or aerosol) passes.

For example, the second segment made of a crimped polymer sheet may be formed of a material having a thickness between approximately 5 µm and approximately 300 µm, for example between approximately 10 µm and approximately 250 µm. In addition, a total surface area of the second segment may be between approximately 300 mm$^2$/mm and approximately 1000 mm$^2$/mm. In addition, an aerosol cooling element may be formed of a material having a specific surface area between approximately 10 mm$^2$/mg and approximately 100 mm$^2$/mg.

Furthermore, the second segment may include a thread containing a volatile flavor component. Here, the volatile flavor component may be menthol, but is not limited thereto. For example, the thread may be filled with the sufficient amount of menthol to provide menthol of 1.5 mg or more to the second segment.

The third segment of the filter rod 22 may be a cellulose acetate filter. A length of the third segment may be appropriately selected within a range of 4 mm to 20 mm. For example, the length of the third segment may be approximately 12 mm, but is not limited thereto.

In manufacturing the third segment, a flavored liquid may be sprayed to the third segment such that the third segment provides flavor. Alternatively, separate fiber coated with a flavored liquid may be inserted into the third segment. The aerosol generated in the tobacco rod 21 is cooled while passing through the second segment, and the cooled aerosol is delivered to a user through the third segment. Therefore, when a flavoring element is added to the third segment, persistence of flavor delivered to a user may be enhanced.

Also, the filter rod 22 may include at least one capsule 23. Here, the capsule 23 may generate flavor or may generate aerosol. For example, the capsule 23 may have a structure, in which a liquid containing a flavoring material is wrapped with a film. The capsule 23 may have a circular or cylindrical shape, but is not limited thereto.

Referring to FIG. 5, the cigarette 3 additionally includes a front-end plug 33. The front-end plug 33 may be located on a side of the tobacco rod 31, the side not facing the filter rod 32. The front-end plug 33 may prevent the tobacco rod 31 from escaping to the outside and may prevent a liquefied aerosol from flowing from the tobacco rod 31 into an aerosol generating device (1 of FIGS. 1 to 3) during smoking.

The filter rod 32 may include a first segment 321 and a second segment 322. Here, the first segment 321 may correspond to the first segment of the filter rod 22 of FIG. 4, and the second segment 322 may correspond to the third segment of the filter rod 22 of FIG. 4.

The diameter and the total length of the cigarette 3 may correspond to the diameter and the total length of the cigarette 2 of FIG. 4. For example, the length of the front end plug 33 is about 7 mm, the length of the cigarette rod 31 is about 15 mm, the length of the first segment 321 is about 12 mm, and the length of the second segment 322 is about 14 mm. However, embodiments are not limited thereto.

The cigarette 3 may be wrapped by at least one wrapper 35. At least one hole through which outside air flows in or inside gas flows out may be formed in the wrapper 35. For example, the front-end plug 33 may be wrapped by a first wrapper 241 351, the tobacco rod 31 may be wrapped by a second wrapper 352, the first segment 321 may be wrapped by a third wrapper 353, and the second segment 322 may be wrapped by a fourth wrapper 354. Also, the entire cigarette 3 may be re-wrapped by a fifth wrapper 355.

Also, at least one perforation 36 may be formed in the fifth wrapper 355. For example, the perforation 36 may be formed in a region surrounding the tobacco rod 31, but is not limited thereto. The perforation 36 may serve to transfer heat generated by the heater 130 shown in FIGS. 2 and 3 into the tobacco rod 31.

Also, the second segment 322 may include at least one capsule 34. Here, the capsule 34 may serve to generate a flavor or serve to generate an aerosol. For example, the capsule 34 may have a structure in which a liquid containing perfume is wrapped in a film. The capsule 34 may have a spherical or cylindrical shape, but is not limited thereto.

The first wrapper 351 may be a metal foil such as aluminum foil bonded to a general filter wrapping paper. For example, the total thickness of the first wrapper 351 may be in the range of 45 um to 55 um, and preferably it may be 50.3 um. In addition, the thickness of the metal foil of the first wrapper 351 may be in the range of 6 um to 7 um, and preferably it may be 6.3 um. In addition, the basis weight of the first wrapper 351 may be in the range of 50 g/m2 to 55 g/m2, and preferably it may be 53 g/m2.

The second wrapper 352 and the third wrapper 353 may be made of a general filter wrapping paper. For example, the second wrapper 352 and the third wrapper 353 may be porous wrapping paper or non-porous wrapping paper.

For example, the porosity of the second wrapper 352 may be 35,000 CU, but is not limited thereto. In addition, the thickness of the second wrapper 352 may be in the range of 70 um to 80 um, and preferably it may be 78 um. In addition, the basis weight of the second wrapper 352 may be in the range of 20 g/m2 to 25 g/m2, and preferably it may be 23.5 g/m2.

For example, the porosity of the third wrapper 353 may be 24,000 CU, but is not limited thereto. In addition, the thickness of the third wrapper 353 may be in the range of 60 um to 70 um, and preferably it may be 68 um. In addition, the basis weight of the third wrapper 353 may be in the range of 20 g/m2 to 25 g/m2, and preferably it may be 21 g/m2.

The fourth wrapper 354 may be made of a polylactic acid (PLA) laminated paper. Here, the polylactic acid (PLA) laminated paper may be a three-layer paper including a paper layer, a polylactic acid (PLA) layer and a paper layer. For example, the thickness of the fourth wrapper 354 may be in the range of 100 um to 120 um, and preferably it may be 110 um. In addition, the basis weight of the fourth wrapper 354 may be in the range of 80 g/m2 to 100 g/m2, and preferably it may be 88 g/m2.

The fifth wrapper 355 may be made of a sterile paper. Here, the sterile paper refers to a paper specially manufactured to improve tensile strength, water resistance, smoothness, and the like, compared to ordinary paper. For example, the basis weight of the fifth wrapper 355 may be in the range of 57 g/m2 to 63 g/m2, and preferably it may be 60 g/m2. In addition, the thickness of the fifth wrapper 355 may be in the range of 64 um to 70 um, and preferably it may be 67 um.

The fifth wrapper 355 may have a predetermined material added therein. Here, silicon may be an example of the predetermined material, but is not limited thereto. For example, silicone has characteristics such as heat resistance, oxidation resistance, resistance to various chemicals, water repellency, and electrical insulation. However, even if it is not silicon, any material having the above-described properties may be applied (or coated) to the fifth wrapper 355 without limitation.

The front-end plug 33 may be made of cellulose acetate. As an example, the front-plug 33 may be manufactured by adding a plasticizer (e.g., triacetin) to cellulose acetate tow. The mono denier of the filaments constituting the cellulose acetate tow may be in the range of 1.0 to 10.0, preferably in the range of 4.0 to 6.0. More preferably, the mono denier of the filament of the front-end plug 33 may be 5.0. In addition, the cross-section of the filament constituting the front-end plug 33 may be Y-shaped. The total denier of the front-end plug 33 may be in the range of 20,000 to 30,000, preferably in the range of 25,000 to 30,000. More preferably, the total denier of the front-end plug 33 may be 28,000.

In addition, as necessary, the front-end plug 33 may include at least one channel, and the cross-sectional shape of the channel may be manufactured in various shapes The cigarette rod 31 may correspond to the cigarette rod 21 described above referring to FIG. 4. Therefore, hereinafter, detailed description of the cigarette rod 31 is omitted.

The first segment 321 may be made of cellulose acetate. For example, the first segment may be a tube-shaped structure containing a hollow therein. As an example, the first segment 321 may be manufactured by adding a plasticizer (e.g., triacetin) to cellulose acetate tow. For example, the mono denier and total denier of the first segment 321 may be the same as the mono and total denier of the front-end plug 33.

The second segment 322 may be made of cellulose acetate. The mono denier of the filaments constituting the second segment 322 may be in the range of 1.0 to 10.0, and preferably may be included in the range of 8.0 to 10.0. More preferably, the mono denier of the filament of the second segment 322 may be 9.0. In addition, the cross-section of the filament of the second segment 322 may be Y-shaped. The total denier of the second segment 322 may be included in the range of 20,000 to 30,000, and preferably it may be 25,000.

Figure 6:
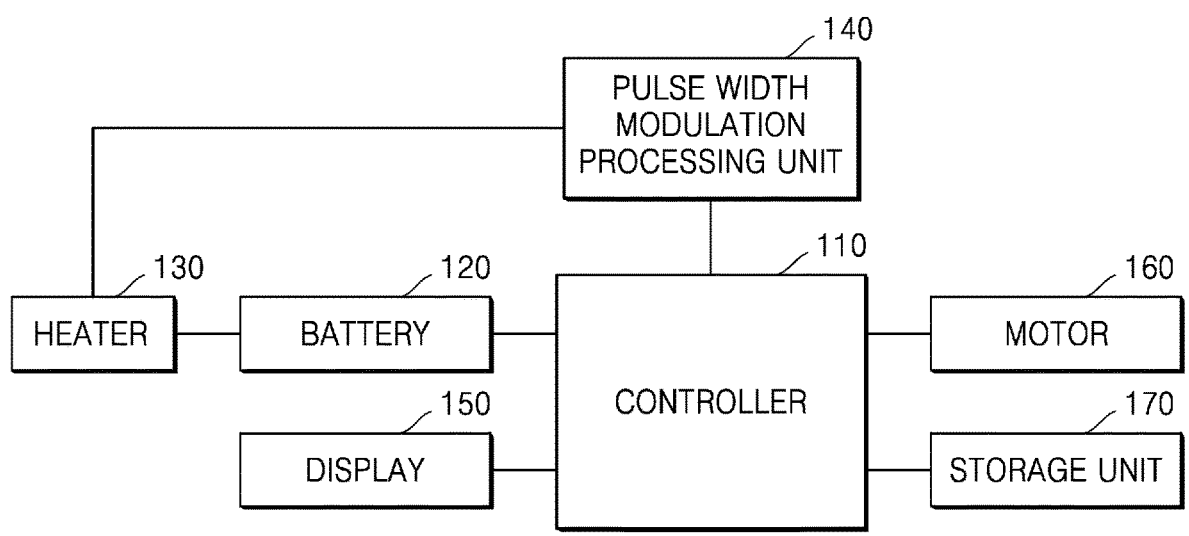
FIG. 6 is a diagram schematically showing a block diagram of an example of an aerosol-generating device according to the present invention.

FIG. 6 is a diagram schematically showing a block diagram of an example of an aerosol-generating device according to an embodiment.

Referring to FIG. 6, the aerosol-generating device according to the present embodiment may include a controller 110, a battery 120, a heater 130, a pulse width modulation processing unit 140, a display 150, a motor 160, and a storage device 170.

The controller 110 controls operations of the battery 120, the heater 130, the pulse width modulation processing unit 140, the display 150, the motor 160, and the storage devices 170 included in the aerosol-generating device. Although not shown in FIG. 6, depending on an embodiment, the controller 110 may further include an input receiving unit (not shown) that receives a user's button input or touch input, and a communication unit (not shown) capable of communicating with an external communication device such as a user terminal. Although not shown in FIG. 6, the controller 110 may further include a module for performing proportional integral differential control (PID) on the heater 130.

The battery 120 supplies power to the heater 130, and an amount of power supplied to the heater 130 may be adjusted by the controller 110.

The heater 130 generates heat by specific resistance when a current is applied. When the aerosol-generating substrate is contacted to or is combined with the heated heater, aerosols may be generated.

The pulse width modulation processing unit 140 allows the controller 110 to control the power supplied to the heater 130 by transmitting pulse width modulation (PWM) signals to the heater 130. Depending on an embodiment, the pulse width modulation processing unit 140 may be implemented to be included in the controller 110.

The display 150 visually outputs various alarm messages generated by the aerosol-generating device 10 so that a user using the aerosol-generating device 10 may check the alarm messages. The user may check a battery power shortage message or a heater overheat warning message output to the display 150, and then may take appropriate measures before an operation of the aerosol-generating device 10 stops or the aerosol-generating device 10 is damaged.

The motor 160 is driven by the controller 110 so that the user may recognize that the aerosol-generating device 10 is ready for use through tactile sense.

The storage device 170 stores various pieces of information to provide a consistent flavor to the user who uses the aerosol-generating device 10 while appropriately controlling power supplied to the heater 130 by the controller 110. For example, information stored in the storage device 170 includes a temperature profile which is referenced by the controller 110 to appropriately control the temperature of the heater over time, a control reference ratio to be described later, and a comparison control value. The storage device 170 may store the temperature profile, the control reference ratio, and the comparison control value in advance, and then transmit the information to the controller 110 at the request of the controller 110. The storage device 170 may not only be configured as a non-volatile memory, such as a flash memory, but also may be configured as a volatile memory that temporarily stores data only when power is supplied in order to secure a faster data input/output (I/O) speed.

The controller 110, the pulse width modulation processing unit 140, the display 150, the storage device 170 and the vaporizer may correspond to at least one processor or may include at least one processor, according to an embodiment the present invention Accordingly, the controller 110, the pulse width modulation processing unit 140, the display 150, the storage device 170 and the vaporizer 180 may be driven in a form included in other hardware device such as a microprocessor or general purpose computer system.

The method of controlling the power supplied to the heater 130 by the controller 110 according to the present invention will be described later in FIG. 7 for convenience of description.

Figure 7:
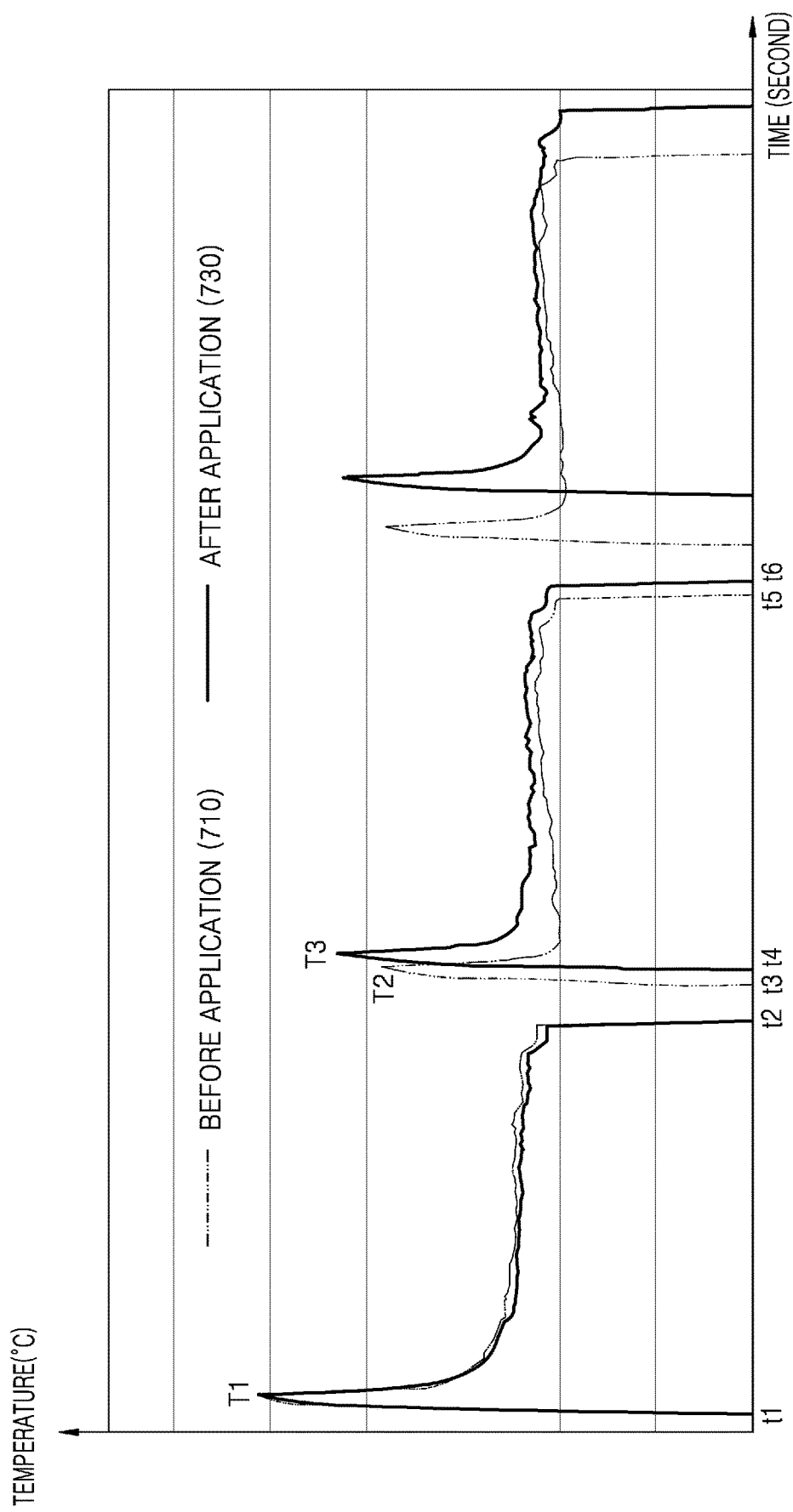
FIG. 7 is a graph for explaining a method of controlling a temperature of a heater of an aerosol-generating device.

FIG. 7 is a graph for explaining a method for controlling a temperature of a heater of an aerosol-generating device.

Referring to FIG. 7, it may be seen that the heater 130 of the aerosol-generating device according to the present invention is heated in a pattern in which the temperature of the heater 130 rises to a maximum T1, then falls and maintains a constant temperature. In detail, the heater 130 is supplied with the power of the battery 120 under control of the controller 110 to represent the temperature curve as shown in FIG. 7. In FIG. 7, a horizontal axis represents time (second), and a vertical axis represents Celsius temperature. In addition, a dotted line 710 in FIG. 7 represents a temperature change graph of the heater 130 before applying the present invention, and a solid line 730 shows a graph of a temperature change of the heater 130 when proportional integral differential (PID) control is performed on power supplied to the heater 130 by applying the integral control weight according to the present invention.

First, when the controller 110 supplies power to the heater 130 from the time t1, the temperature of the heater 130 rises to a preheating target temperature T1. Then, the temperature of the heater 130 rapidly decreases to and is maintained at a certain temperature. The user may enjoy smoking through the aerosol-generating device after the heater 130 reaches the preheating target temperature. As another example, when the heater 130 has reached the preheating target temperature or a certain period of time has elapsed after reaching the preheating target temperature, the controller 110 may output to the user through the display 150 information indicating that preheating of the heater 130 is completed and the user may start smoking. The user may inhale the aerosol through the aerosol-generating device for a certain period of time during which the temperature of the heater 130 is maintained after the notification is output.

Hereinafter, for convenience of description, in FIG. 7, a time interval between $t_1$ and $t_2$ is referred to as a first smoking section, a time interval between $t_3$ and $t_5$ is referred to as a second smoking section, and a time interval between $t_4$ and $t_6$ is referred to as a third smoking section. Each smoking section contains at least one puff. The first, second, and third smoking sections are for distinguishing each smoking section, and the smoking does not necessarily progresses in this order.

According to a conventional aerosol-generating device, in the first smoking section, the temperature of the heater 130 rapidly decreases at $t_2$ by user's smoking. If the user smokes again through the aerosol-generating device within a certain time period, the heater 130 is heated again in the second smoking section. In this process, if the controller 110 controls the power supplied to the heater 130 through the proportional integral differential (PID) control in a state the temperature of the heater 130 is not sufficiently lowered, the preheating target temperature of the heater 130 is lowered to $T_2$ of the second smoking section, not $T_1$. In addition, a holding temperature of the heater 130 maintained until the time $t_5$ after reaching the preheating target temperature $T_2$ is also lower than a holding temperature of the first smoking section. If the preheating target temperature and holding temperature in the second smoking section are lower than the preheating target temperature and holding temperature in the first smoking section, respectively, the heat energy is not sufficiently transferred to the aerosol-generating substrate, and thus, it is difficult to secure a sufficient amount of atomization.

On the other hand, according to the aerosol-generating device according to the present invention, when a user smokes again within a certain time period after smoking in the first smoking section in which the temperature of the heater 130 rapidly drops at $t_2$, the heater 130 is heated again according to the third smoking section. In this process, the controller 110 controls the power supplied to the heater 130 through the proportional integral differential control in a state the temperature of the heater 130 is not sufficiently lowered. By integral control, the controller 130 corrects an integral control gain value based on an integral proportional weight, such that the temperature of the heater 130 in the third smoking section may increase to a preheating target temperature $T_3$ and a holding temperature which is maintained after the preheating target temperature $T_3$ is also higher than a holding temperature of the second smoking section. The controller 110 may include a timer to measure an interval between time $t_2$ and time $t_4$. The controller 110 may determine that there is a continuous smoking by the user if the measured time interval is within a preset range.

As described in FIG. 7, according to the present invention, the controller 110 included in the aerosol-generating device controls the power supplied to the heater based on the integral control weight determined depending on an initial temperature of the heater through the proportional integral differential (PID) control. As such, even if a user continuously smokes through the aerosol-generating device, a sufficient amount of atomization may be provided to the user.

$$c(t) = K_P * e(t) + K_I * \int_0^t e(\tau)d\tau + K_D * \frac{de}{dt} \qquad \text{[Equation 1]}$$

Equation 1 shows an example of a control function used when the controller 110 controls the power supplied to the heater through a general proportional integral differential method. Since the general proportional integral differential control method is a known technique, description of each variable is omitted. The controller 110 may obtain an appropriate proportional control gain value, integral control gain value, and differential control gain value through trial and error by a mathematical, experimental, or empirical method. However, according to the proportional integral differential control method as described above, it is not possible to prevent a decrease in the aerosol atomization amount occurring when a user continuously smokes.

$$c^*(t) = K_P * e(t) + K_I * \left( \int_0^t e(\tau)d\tau + C_I \right) + K_D * \frac{de}{dt} \qquad \text{[Equation 2]}$$

Equation 2 shows an example of a control function used when the controller 110 controls power supplied to the heater according to the present invention. In Equation 2, $C_I$ means the integral control weight. In the present invention, by determining the integral control weight according to the initial temperature of the heater 130 and using the determined integral control weight to perform integral control, even if the user continuously uses the aerosol-generating device, it is possible to provide a sufficient amount of aerosol to the user. Depending on an embodiment, the controller 110 may directly calculate the integral control weight based on the initial temperature of the heater 130, or obtain the integral control weight by referring to a weight table stored in the storage device 170.

Hereinafter, various exemplary embodiments in which the controller 110 determines the integral control weight in the present invention will be described.

As an exemplary embodiment, the controller 110 may calculate the integral control weight based on the initial temperature of the heater after a certain period of time has elapsed, after the heater reaches the preheating target temperature. According to this exemplary embodiment, when the temperature of the heater 130 decreases after a certain period of time has elapsed after the heater 130 reaches the preheating target temperature, the controller 110 regards the lowered temperature as the initial temperature of the heater 130 and calculates the integral control weight based thereon. Referring to FIG. 7, when a certain time elapses after the temperature of the heater 130 reaches $T_1$, the controller 110 considers that a user's primary smoking is over at $t_2$, and calculates the integral control weight by using the temperature of the heater 130 at a time point after $t_2$ as an initial temperature.

As another exemplary embodiment, the controller 110 may calculate an integral control weight based on an integral control gain value when the heater 130 is preheated and reaches 50° C. or may calculate an integral control weight based on an integral control gain value when the heater 130 reaches a maximum temperature.

$$C_I = \left(a * \frac{K_{Imax} - K_{50}}{T_{max} - 50}\right) * T_{Initial} + C_r \quad \text{[Equation 3]}$$

Equation 3 is an example of the equation used by the controller 110 to calculate the integral control weight based on the initial temperature of the heater 130. In Equation 3, $K_{Imax}$ is an integral control gain value when the temperature of the heater 130 is the highest temperature in the immediately preceding smoking section, $K_{50}$ is an integral control gain value when the temperature of the heater 130 is 50° C. in the immediately preceding smoking section, $T_{max}$ is the maximum temperature of the heater 130 in the immediately preceding smoking section, $T_{Initial}$ is the initial temperature of the heater 130, a is a proportional constant greater than 1 and less than 3, and $C_r$ is an arbitrary constant. The controller 110 may calculate the integral control weight based on Equation 3, and the values necessary to calculate the integral control weight may be collected and stored in the storage device 170 when the heater 130 is heated in the immediately preceding smoking section.

As another exemplary embodiment, the controller 110 may determine the integral control weight by referring to a table in which the integral control weight values are respectively associated with initial temperatures of the heater 130.

TABLE 1

| Initial temperature range of heater | Integral control weight (Ci) |
|---|---|
| Less than 50 degrees | 0 |
| 50~100 | 20 |
| 100~150 | 38 |
| 150~200 | 58 |
| 200~250 | 70 |

Figure 8:
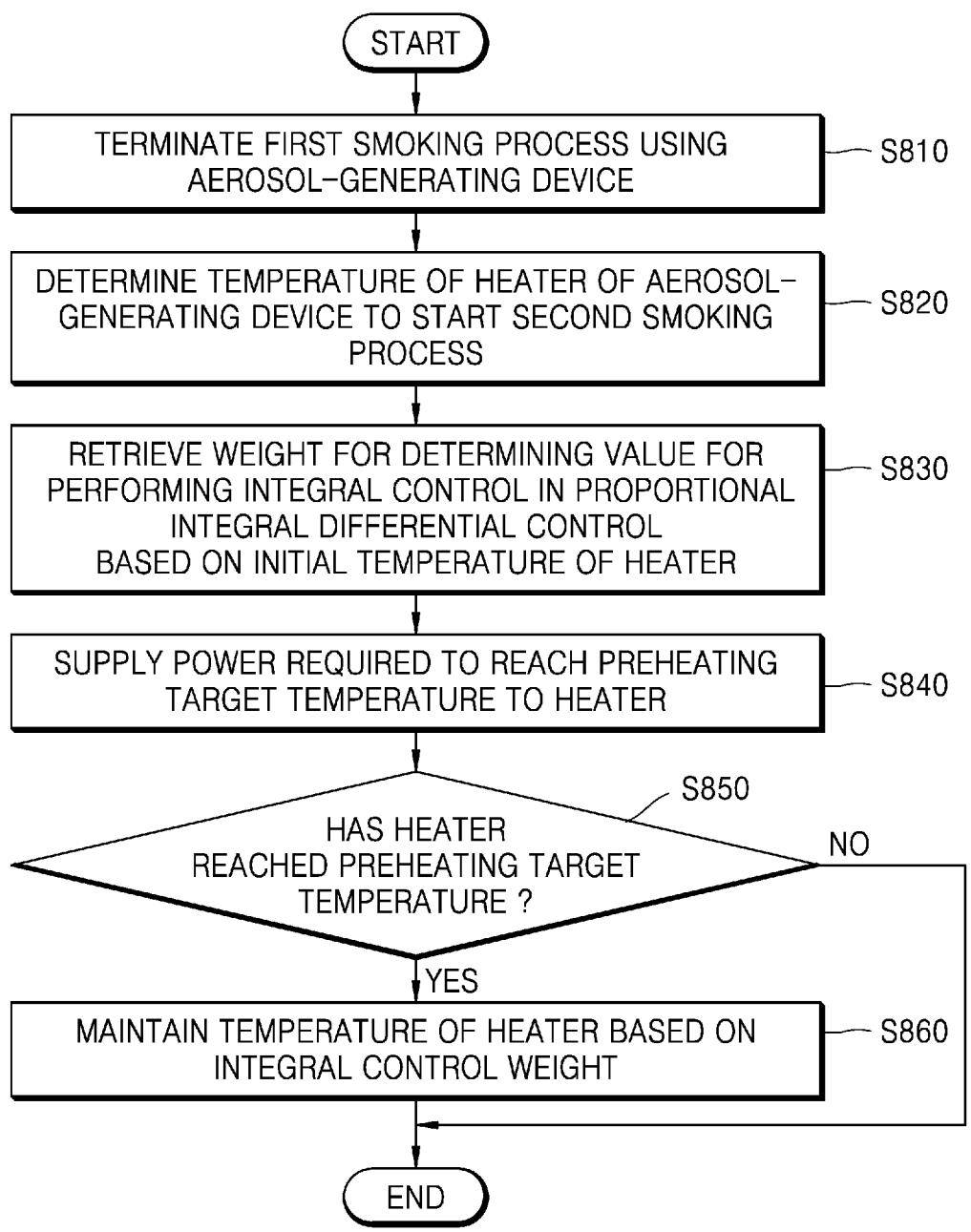
FIG. 8 is a flowchart illustrating an example of a method of controlling power of a heater of an aerosol-generating device according to the present invention.

Table 1 shows an example of a table stored in the storage device 170. According to Table 1, if an initial temperature of the heater is between 50 and 100 degrees, the controller 110 may determine an integral control weight as 20. If an initial temperature of the heater is between 150 and 200 degrees, the controller 110 may determine an integral control weight as 58. Table 1 is a table that the controller 110 refers to when the aerosol-generating device is continuously used. In the case where the aerosol-generating device is not continuously used, the controller 110 does not refer to Table 1 and does not determine the integral control weight. The integral control weight corresponding to the initial temperature range of the heater in Table 1 is only an example, and the detailed values may vary according to embodiments. FIG. 8 is a flowchart illustrating an example of a method for controlling power of a heater of an aerosol-generating device according to the present invention.

Since the method according to FIG. 8 may be implemented by the aerosol-generating device according to FIG. 6, it will be described below with reference to FIG. 6, and descriptions overlapping with those described in FIG. 6 will be omitted.

First, in step S810, a first smoking process through the aerosol-generating device is terminated by a user. In step S810, the controller 110 included in the aerosol-generating device may store the integral control gain value, which is used to control the temperature of the heater in the first smoking process, in the storage device 170.

In step S820, the controller 110 identifies the temperature of the heater of the aerosol-generating device to start a second smoking process. The controller 110 measures the time interval between the end of the first smoking process and the start of the second smoking process through a built-in timer. If the measured time interval is within a certain period of time, the controller 110 determines that a continuous smoking has occurred, and controls the power supplied to the heater 130 according to the present invention.

In step S830, the controller 110 determines an integral control gain value for performing integral control as part of proportional integral differential control based on the initial temperature of the heater. In detail, the controller 110 retrieves the integral control weight for determining the integral control gain value. The integral control weight retrieved in step S830 may be a value stored as a table in the storage device 170 or a value calculated by the controller 110 according to Equation 3 as the initial temperature of the heater.

In step S840, the controller 110 supplies power required to increase the temperature of the heater 130 to a preheating target temperature. In step S850, the controller 110 determines whether the heater 130 has reached the preheating target temperature. In step S860, if the heater has reached the preheating target temperature, the controller 110 controls the temperature of the heater 130 to be maintained constant by performing integral control based on the integral control weight retrieved in step S830.

In step S860, which is a step of maintaining the temperature of the heater 130 in accordance with the integral control weight, the integral term corrects the steady-state error in the proportional integral differential control. This is based on the tendency that the integral proportional gain is determined after the proportional control gain is first determined. According to steps S840 to S860, the temperature of the heater 130 is heated to a sufficiently high preheating target temperature (for example, $T_3$ in FIG. 7) and maintained constant. As such, sufficient thermal energy may be transferred to the aerosol-generating substrate, and the user may have a consistent smoking feeling without a lack of atomization over the course of continuous smoking.

The above-described embodiment according to the present invention may be implemented in a form of a computer program that may be executed through various components on a computer, and such a computer program may be recorded on a computer-readable medium. Here, the medium may include a hardware device specifically configured to store and execute program instructions, such as a magnetic media including hard disks, floppy disks and magnetic tapes, an optical recording media including CD-ROMs and DVDs, a magneto-optical media including floptical disks, and a memory including ROM, RAM and flash memory.

Moreover, the computer program may be specially designed and configured for the present invention, or may be known and available to those skilled in the computer software field. Examples of computer programs may include not only machine language codes generated by a compiler, but also high-level language codes that may be executed by a computer using an interpreter or the like.

The specific implementations described in the present invention are exemplary embodiments, and do not limit the scope of the present invention in any way. For brevity of a specification, descriptions of conventional electronic configurations, control systems, software, and other functional aspects of the systems may be omitted. In addition, the connection or connection members of the lines between the components shown in the drawings are illustratively showing functional connections and/or physical or circuit connections, and in a real device, it may be represented as an alternative or additional various functional connections, physical connections, or circuit connections. In addition, unless specifically mentioned, such as "essential", "importantly", etc., it may not be a necessary component for application of the present invention.

In the specification (particularly in the claims) of the present invention, the use of an indication term "the" and similar indication terms may be in both singular and plural. In addition, when a range is described in the present invention, it includes the invention to which individual values belonging to the above range are applied (unless otherwise stated), and this is the same as describing each individual value constituting the above range in the detailed description of the invention. In addition, unless there is a clear or contradictory description of steps constituting the method according to the invention, the steps may be done in a suitable order. The present invention is not necessarily limited to the description order of the steps. The use of all examples or exemplary terms (for example, etc.) in the present invention is merely to describe the present invention in detail, and the scope of the present invention is not limited by the examples or exemplary terms unless they are limited by the claims. In addition, those skilled in the art may recognize that various modifications, combinations, and changes may be configured according to design conditions and factors within the scope of the appended claims or equivalents thereof.

INDUSTRIAL APPLICABILITY

One embodiment of the present invention may be used to manufacture a next-generation electronic cigarette with improved performance than the prior art.

What is claimed is:

1. An aerosol-generating device comprising:
a heater configured to heat an aerosol-generating substrate; and
a controller configured to:
control a first smoking section and a second smoking section consecutive to the first smoking section,
determine a temperature after smoking ends in the first smoking section as an initial temperature of the heater, and
control power supplied to the heater in the second smoking section through a proportional integral differential (MD) method, based on an integral control weight determined according to the initial temperature of the heater.

2. The aerosol-generating device of claim 1, wherein the controller calculates the integral control weight based on the initial temperature of the heater which is measured after a preset time has elapsed after a temperature of the heater reaches a preset preheating temperature.

3. The aerosol-generating device of claim 1, wherein the controller calculates the integral control weight based on an integral control gain value used when the heater is preheated to 50° C.

4. The aerosol-generating device of claim 1, wherein the controller calculates the integral control weight based on a highest temperature which the heater has reached in the first smoking section.

5. The aerosol-generating device of claim 1, wherein the controller calculates the integral control weight based on a highest integral control gain value in the first smoking section, by referring to integral control gain values used in the first smoking section of the heater.

6. The aerosol-generating device of claim 1, wherein the controller determines the integral control weight by referring to a table in which integral control weights are respectively associated with initial temperatures of the heater.

7. The aerosol-generating device of claim 1, wherein the integral control weight is equal to or greater than 20.

8. The aerosol-generating device of claim 1, wherein the integral control weight is equal to or less than 70.

9. The aerosol-generating device of claim 1, wherein the integral control weight is in a range of 20 to 70.

10. A method of controlling power supplied to a heater of an aerosol-generating device in a first smoking section and a second smoking section, the method comprising:
determining a temperature after smoking ends in the first smoking section as an initial temperature of a heater of an aerosol-generating device;
determining an integral control weight for integral control in proportional integral differential control based on the determined initial temperature of the heater; and
maintaining a temperature of the heater in the second smoking section consecutive to the first smoking section based on the determined integral control weight after the temperature of the heater reaches a preheating temperature.

11. The method of claim 10, wherein the determining of the integral control weight includes calculating the integral control weight based on the initial temperature of the heater which is measured after a certain period of time has elapsed after the temperature of the heater reaches a preset preheating temperature.

12. The method of claim 10, wherein the determining of the integral control weight includes calculating the integral control weight based on an integral control gain value used when the heater is preheated to 50° C.

13. The method of claim 10, wherein the determining of the integral control weight includes calculating the integral control weight based on a highest temperature which the heater has reached in the first smoking section.

14. The method of claim 10, wherein the determining of the integral control weight includes calculating the integral control weight based on a highest integral control gain value in the first smoking section, by referring to integral control gain values used in the first smoking section.

15. The method of claim 10, wherein the determining of the integral control weight includes determining the integral control weight by referring to a table in which integral control weights are respectively associated with initial temperatures of the heater.

16. The method of claim 10, wherein the integral control weight is equal to or greater than 20.

17. The method of claim 10, wherein the integral control weight is equal to or less than 70.

18. The method of claim 10, wherein the integral control weight is in a range of 20 to 70.

19. A computer-readable recording medium storing a program for executing the method according to claim 10.

\* \* \* \* \*